United States Patent [19]

Barwich et al.

[11] Patent Number: 5,772,851
[45] Date of Patent: Jun. 30, 1998

[54] ELIMINATION OF VOLATILE RESIDUES FROM POLYACRYLATE MELTS

[75] Inventors: Jürgen Barwich, Neustadt; Oral Aydin, Mannheim; Ulrich Erhardt, Ladenburg; Walter Holtrup, Frankenthal, all of Germany

[73] Assignee: BASF Aktiengesellschaft, Germany

[21] Appl. No.: 664,802

[22] Filed: Jun. 17, 1996

Related U.S. Application Data

[63] Continuation of Ser. No. 347,235, Nov. 23, 1994, abandoned.

[51] Int. Cl.⁶ .............................. B01D 3/10; B01D 3/34; C08F 6/26; C08F 6/28
[52] U.S. Cl. ..................... 203/49; 159/16.1; 159/16.3; 159/47.1; 159/901; 159/DIG. 10; 159/DIG. 16; 159/DIG. 20; 203/96; 203/94; 203/97; 203/98; 528/500; 528/501
[58] Field of Search .................... 203/94, 93, 96, 203/100, 49, 97, 98; 159/16.1, DIG. 20, 16.3, DIG. 16, 47.1, 901, DIG. 10; 528/500, 501, 503; 526/67, 902

[56] References Cited

U.S. PATENT DOCUMENTS

| | | | |
|---|---|---|---|
| 3,409,515 | 11/1968 | Baird et al. | 159/DIG. 10 |
| 3,412,779 | 11/1968 | Wagner et al. | 159/DIG. 10 |
| 3,434,523 | 3/1969 | Ceausescu et al. | 159/DIG. 10 |
| 3,505,300 | 4/1970 | Galloway | 159/DIG. 10 |
| 3,987,235 | 10/1976 | Fujimoto | 528/481 |
| 4,383,972 | 5/1983 | McCurdy et al. | 202/205 |
| 4,637,857 | 1/1987 | Brockmann et al. | 159/DIG. 10 |
| 4,710,563 | 12/1987 | Oetting | 528/501 |
| 5,024,728 | 6/1991 | Morita et al. | 159/DIG. 10 |
| 5,118,388 | 6/1992 | Aboul-Nasr | 159/DIG. 10 |

FOREIGN PATENT DOCUMENTS

| | | | |
|---|---|---|---|
| 0682109 | 3/1964 | Canada | 159/DIG. 10 |
| 584926 | 3/1994 | European Pat. Off. | |
| 0155803 | 9/1984 | Japan. | |
| 2214701 | 8/1990 | Japan. | |
| 0334956 | 2/1991 | Japan. | |
| 1581335 | 7/1990 | U.S.S.R. | 159/DIG. 10 |
| 0990684 | 6/1965 | United Kingdom | 159/16.3 |

Primary Examiner—Virginia Manoharan
Attorney, Agent, or Firm—Keil & Weinkauf

[57] ABSTRACT

Volatile components are eliminated from polyacrylate melts by distilling off the volatile components by a process in which the volatile components are distilled off under reduced pressure, entraining agents are added to the melts at above 100° C. and the melts are simultaneously circulated.

12 Claims, 3 Drawing Sheets

ELIMINATION OF VOLATILE RESIDUES FROM POLYACRYLATE MELTS

This application is a continuation of application Ser. No. 08/347,235, filed on Nov. 23, 1994 now abandoned.

The present invention relates to a process for eliminating volatile residues from polyacrylate melts.

Polyacrylate melts are used, for example, as flexible resins for plasticizing adhesive raw materials and coating raw materials on the one hand and, on the other hand, as a raw material base for the new generation of UV-crosslinkable acrylate hotmelt adhesives.

An important requirement of the suitability of polyacrylate melts is an extremely low content of volatile residues, for example residual solvents, residual monomers and impurities. This applies in particular to the last-mentioned UV-crosslinkable hotmelt adhesives. Particularly when used in medical products, for example skin plasters, an extremely low content of migrating substances is essential. However, a large amount of volatile residues also quickly accumulates during melt application on the modern, very high-speed coating machines (belt speed up to 600 m/min) and necessitates special complicated technical procedures for their removal.

The preparation of the polyacrylate melts can be divided into three phases. The first step is the polymerization in the presence or absence of a solvent. Thereafter, in the second step, the solvents are removed or residual monomers are stripped off. This is followed by filling of the product by means of, for example, a gear pump delivery.

The polymerization is carried out in conventional manner in a polymerization apparatus consisting of a polymerization kettle which is generally provided with a commercial stirrer, a plurality of feed vessels, a reflux condenser and a heating/cooling means and is equipped for operation in an inert gas atmosphere and at superatmospheric or reduced pressure.

Very different technical methods may be used for the removal of the solvent (evaporating of the solvent while retaining the polyacrylate melt). Here, the classical distillation in the kettle may be mentioned first. However, other conventional processes are the use of a falling film evaporator, degassing of extrudates or devolatilization in an extruder. A very comprehensive list of different evaporation methods appears in the book series: Kunststofftechnik, Entgasen beim Herstellen und Aufbereiten von Kunststoffen, published by Verein Deutscher Ingenieure, VDI Gesellschaft, Kunststofftechnik, VDI Verlag, 1992.

For the abovementioned reasons, there is a need to minimize the volatile residues.

Surprisingly, it has been found that the amount of volatile residues can be reduced to substantially below 100 ppm if entraining agents, such as steam, nitrogen, argon or $CO_2$, are introduced into the hot polyacrylate melt toward the end of the distillation under reduced pressure and are then taken off together with the volatile residues. A further substantial improvement is achieved if optimization of the polymer mixing and an increase in surface area are realized simultaneously. This is done by circulating the polyacrylate melt by means of a gear pump and a bypass.

The steam proves to be particularly advantageous as an entraining agent, which is advantageously fed directly into the bypass. It should be ensured that the internal temperature of the kettle and the internal temperature of the bypass are continuously above 100° C., ie. the steam must not be allowed to condense.

There is in principle a large number of processes for separating off volatile residues from polymer melts. Economical devolatilization of relatively highly viscous plastics melts can be effected, for example, by degassing extrudates or treating the products in a devolatilization extruder. Both processes have specific disadvantages. While the blockage of the tube bundles often presents problems in the degassing of extrudates (specks, gel particles, caking), disadvantages of devolatization in an extruder are, on the one hand, the high shearing of the polymer melt but, on the other hand, also the increased space requirement of this devolatilization means and the very high capital cost. An overview appears in the series: Kunststofftechnik, Entgasen beim Herstellen und Aufbereiten von Kunststoffen, published by Verein Deutscher Ingenieure, VDI Gesellschaft Kunststofftechnik, VDI Verlag 1992. Steam as an entraining agent is described here only in the systems polystyrene or LDPE and PE copolymers in combination with devolatilization in an extruder.

The residual monomer content of polyacrylate melts is generally reduced by means of chemical deodorization. Polymerization is completed very readily by adding a higher peroxide concentration at the end of the polymerization at elevated temperatures. The disadvantages of this process are the uncontrolled graft reactions, which lead to formation of specks and gel particles. This effect is particularly problematic when such polyacrylate melts are used in highly transparent clear coats. For the chemical deodorization of polyacrylate melts, the solvents are generally separated off by conventional evaporation in the reaction kettle.

The removal of solvents or residual monomers from polyacrylate melts by steam distillation under reduced pressure is described in Chemical Abstract 100 (14) (process according to Butaciu, Sirbu, Eivnic, Jacob, Tataru, Doina, Berea). However, the process relates to aqueous suspension polymers, ie. water is present from the outset (conventional deodorization method for polymer emulsions).

It is an object of the present invention to provide a process for eliminating volatile residues from polyacrylate melts, in which the stated disadvantages are avoided.

We have found that this object is achieved, according to the invention, if the volatile components are evaporated off under reduced pressure, entraining agents are added to the melts at above 100° C. and the melts are simultaneously circulated.

Other features of the novel process form the subject of the sub-claims.

Essential features according to the invention are described in detail below and illustrated in the drawings and with reference to the examples.

The polymerization is carried out in a polymerization apparatus consisting of a polymerization kettle which is provided with a commercial stirrer, a plurality of feed vessels, a condenser, heating and cooling means and a circulation with steam inlet. The polymerization kettles have a volume of 10 l–20 m$^3$, 10 l–10 m$^3$, and are equipped for working under an inert gas atmosphere, under superatmospheric and reduced pressure.

For the preparation of the acrylate homopolymers or copolymers, the conventional processes of free radical polymerization in water or solution may be used. The polymerization is generally carried out to a monomer conversion of more than 80%, preferably more than 90%, very particularly preferably more than 99%.

All known methods of stirring may be used for mixing the reaction mixture consisting of monomers and the initiator in the vessel.

The copolymers are prepared at from 20° to 150° C., preferably from 70° to 120° C., from 0.1 to 100, preferably from 1 to 10, bar, in the presence of from 0.01 to 10% by weight, based on the monomers, of peroxides or azo compounds as polymerization initiators, and in the presence of from 0 to 200, preferably from 5 to 25, % by weight, based on the monomers, of inert solvents, ie. by solution or mass polymerization.

The solvents used are preferably those which boil within a range from 50° to 150° C., for example hydrocarbons, such as benzene, toluene and o-, m- or p-xylene, and gasolines which preferably boil within a range from 60° to 120° C., as well as alcohols, such as methanol, ethanol, propanol, butanol and isobutanol, ketones, such as acetone, methyl ethyl ketone and methyl isobutyl ketone, nitriles, such as acetonitrile and benzonitrile, or mixtures of the stated solvents. Solvents such as toluene, isobutanol and ethyl acetate and mixtures thereof are preferred.

Peroxides, for example acyl peroxides, such as benzoyl peroxide, dilauroyl peroxide, didecanoyl peroxide and isononanoyl peroxide, alkyl esters, such as tert-butyl perpivalate, tert-butyl per-2-ethylhexanoate, tert-butyl permaleate, tert-butyl perisononanoate, tert-butyl perbenzoate and tert-amyl per-2-ethylhexanoate, dialkyl peroxides, such as dicumyl peroxide, tert-butyl cumyl peroxide and di-tert-butyl peroxide, and peroxodicarbonates may be used as polymerization initiators.

Azo initiators, such as 2,2'-azobisisobutyronitrile, 2,2'-azobis(methylisobutyrate) and 2,2'-azobis(2,4-dimethylvaleronitrile), may also be used as initiators.

Four groups (a–d) can be used as monomers:

a) The conventional monoolefinically unsaturated monocarboxylic esters of 3 to 24 carbon atoms, in particular esters of acrylic and methacrylic acid, may be used as monomers. Particularly important monomers are the acrylates and methacrylates of alkanols of 1 to 12 carbon atoms, such as methyl acrylate, ethyl acrylate, propyl acrylate, isopropyl acrylate, n-butyl acrylate, isobutyl acrylate, isoamyl acrylate, 2-ethylhexyl acrylate, isooctyl acrylate and methacrylate, methyl methacrylate and decyl acrylate and methacrylate and dodecyl acrylate and methacrylate.

b) Monomers such as α,β-monoolefinically unsaturated mono- or dicarboxylic acids of 3 to 6 carbon atoms, for example acrylic acid, methacrylic acid, itaconic acid, fumaric acid and/or maleic acid, and furthermore the anhydrides of mono-olefinically unsaturated dicarboxylic acids, such as maleic anhydride and itaconic anhydride.

c) Reactive monomers, such as acrylamide and methacrylamide, tetrahydrofurfuryl(meth)acrylamide, diacetoneacrylamide, hydroxyalkyl (meth)acrylates, such as 2-hydroxyethyl (meth)acrylate and 4-hydroxybutyl (meth)acrylate, and furthermore monomers which carry photoreactive groups, eg. N-(acrylamidomethyl)-benzophenone-4-carboxamide, 4-acryloyl-oxybutylcarbonatobenzophenone or 2-methacryloyloxyethelene-carbonatobenzophenone.

d) Monomers such as N-vinylpyrrolidone and N-vinylformamide, acrolein, methacrolein, isobutene, butadiene, isoprene, vinyl methyl ether, vinyl isobutyl ether, vinylpyridine, styrene and methylstyrene, monomers such as vinylcaprolactam and monomers such as tetrahydrofurfur-2-yl acrylate and methacrylate. The vinyl esters of carboxylic acids of 1 to 18 carbon atoms, eg. vinyl acetate or vinyl propionate, are also particularly important.

The monomers may be added to the reaction mixture in the form of pure substances, as mixtures with the other monomers or as solutions in suitable solvents. The individual monomers can be fed into the kettle by separate feed lines or together via a pipe junction.

In order to carry out the polymerization, compounds which reduce the degree of polymerization, ie. polymerization regulators, for example mercaptans, such as mercaptoethanol, mercaptosuccinic acid, 3-mercaptopropyltrimethoxysilane or dodecyl mercaptan, may also be added to the reaction mixture.

For successful postpolymerization, the polymer melt or solution is brought to the boil for a few hours after the end of the initiator and monomer feed. No chemical postpolymerization is necessary in the novel process. This dispenses with the resulting disadvantages.

The solvent is preferably evaporated off at the boil under reduced pressure. Distillation is continued until no further substantial reflux is observed. By starting up the gear pump, the kettle contents are then rapidly circulated (1×kettle volume per 4 hours, preferably 1×kettle volume per hour) under reduced pressure from a liquid seal pump, steam simultaneously being passed in (at from 2 to 20, preferably from 4 to 16, bar). The steam should be mixed very thoroughly with the polymer melt (static mixer, special nozzle geometry in steam inlet useful). The mixture of volatile residues and steam is flashed into the upper kettle region, a very large proportion of the volatile components being stripped off under reduced pressure (cf. FIG. 1). A separate water-containing vessel may be started up for this purpose. The mixture comprising volatile residues and water should be specially worked up. The duration of the steam treatment can be directly correlated with the content of volatile residues, ie. steam stripping must be carried out until the specifications with regard to residual monomers in the various products are reached.

When a 2-kettle plant is put into operation, polymerization and distillation can be completely (cf. FIG. 2) or partially (cf. FIG. 3) decoupled.

While in a plant according to FIG. 2 the distillation is carried out completely in the distillation kettle equipped with steam inlet and circulation, in a plant according to FIG. 3 the distillation can be carried out partially in the polymerization kettle.

The copolymers prepared by the novel process have K values of from 10 to 120, in particular from 15 to 80, preferably from 20 to 60, determined according to DIN 53726 in 1% strength solution in tetrahydrofuran at 25° C.

Of particular interest are copolymers whose monomer composition is such that a glass transition temperature of from –50° to 0 ° C., particularly preferably from –45° to –5° C., is reached. According to Fox (T. G. Fox, Bull. Am. Phys. Soc. (Ser. II) 1, (1956) 123), the following is a good approximation for the glass transition temperature of copolymers:

$$\frac{1}{Tg} = \frac{X^1}{Tg^1} + \frac{X^2}{Tg^2} + \ldots \frac{X^s}{Tg^s}$$

where $X^1, X^2, \ldots X^s$ are the mass fractions of the monomers 1, 2, . . . and $Tg^1, Tg^2, \ldots Tgs$ are the glass transition temperatures, in degrees Kelvin, of the polymers composed in each case of only one of the monomers 1, 2, . . . or s. The glass transition temperatures of the abovementioned monomers are essentially known and are stated, for example, in J. Brandrup, E. H. Immergut, Polymerhandbook, $1^{st}$ Ed., J. Wiley, N.Y. 1966, and $2^{nd}$ Ed., J. Wiley, N.Y. 1975.

The copoloymers prepared by the novel process may be used in particular as UV-crosslinkable materials for coating, lamination and impregnation, in particular for the production of contact adhesives, contact adhesive films, contact adhesive tapes, contact adhesive labels and blocking foils. The materials may be applied in a conventional manner by brushing, spraying, roller coating, knife coating or pouring, if necessary at elevated temperatures, in general at from 20° to 180° C., to conventional substrates, for example to paper, board, wood, glass, metals, metal foils, for exmaple aluminum and copper, and plastics films, for example plasticized PVC, polypropylene, polyethylene, polyamides and polyesters. It is also possible to coat nonwovens, fibers, leather and textile fabrics. The copolymers may also be applied, for example for the production of contact adhesive labels, to substrates such as paper by the transfer method, by first applying them to substrates coated with a release material, for example siliconized paper, and, in the case of the UV-crosslinkable materials, exposing them to UV light and then laminating them with, for example, paper. After the siliconized paper has been peeled off, the tacky layer may be exposed to UV light again. Suitable UV lamps are conventional lamps, for example medium-pressure mercury lamps having a radiant power of from 80 to 240 watt/cm. The novel contact adhesives can be modified and/ or compounded in a manner known per se.

The conventional tackifiers, for example hydrocarbon resins, modified rosins, pinene and terpene resins, or homopolymers such as poly(2-methylhexyl acrylate) and poly(n-butyl acrylate), plasticizers, for example those based on mono-, di- or polyester compounds, pigments, stabilizers, styrene/butadiene copolymers or polyvinyl ethers may be added to the copolymers in amounts of up to 50% by weight.

Polyacrylate melts based on butyl acrylate are preferably used as flexible resins for plasticizing adhesive raw materials, coating raw materials and plastics formulations. These products are particularly lightfast and resistant to aging. A particular requirement for the suitability of these products for use is their freedom from specks. Particularly in the case of use as a coating raw material, this property is required for high gloss and good leveling.

DESCRIPTION OF THE PREFERRED EMBODIMENTS

Figure 1:
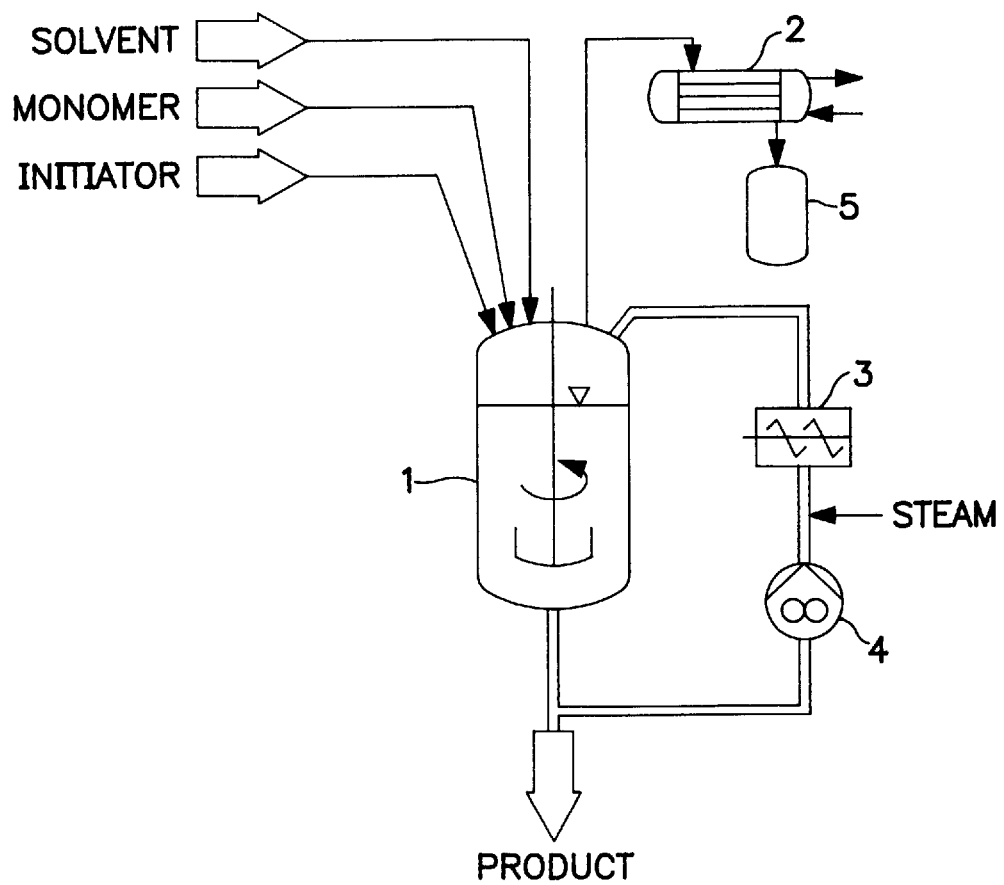
FIG. 1 is a 1-kettle plant apparatus in which polymerization, distillation and circulation with steam are carried out in a kettle.
Figure 2:
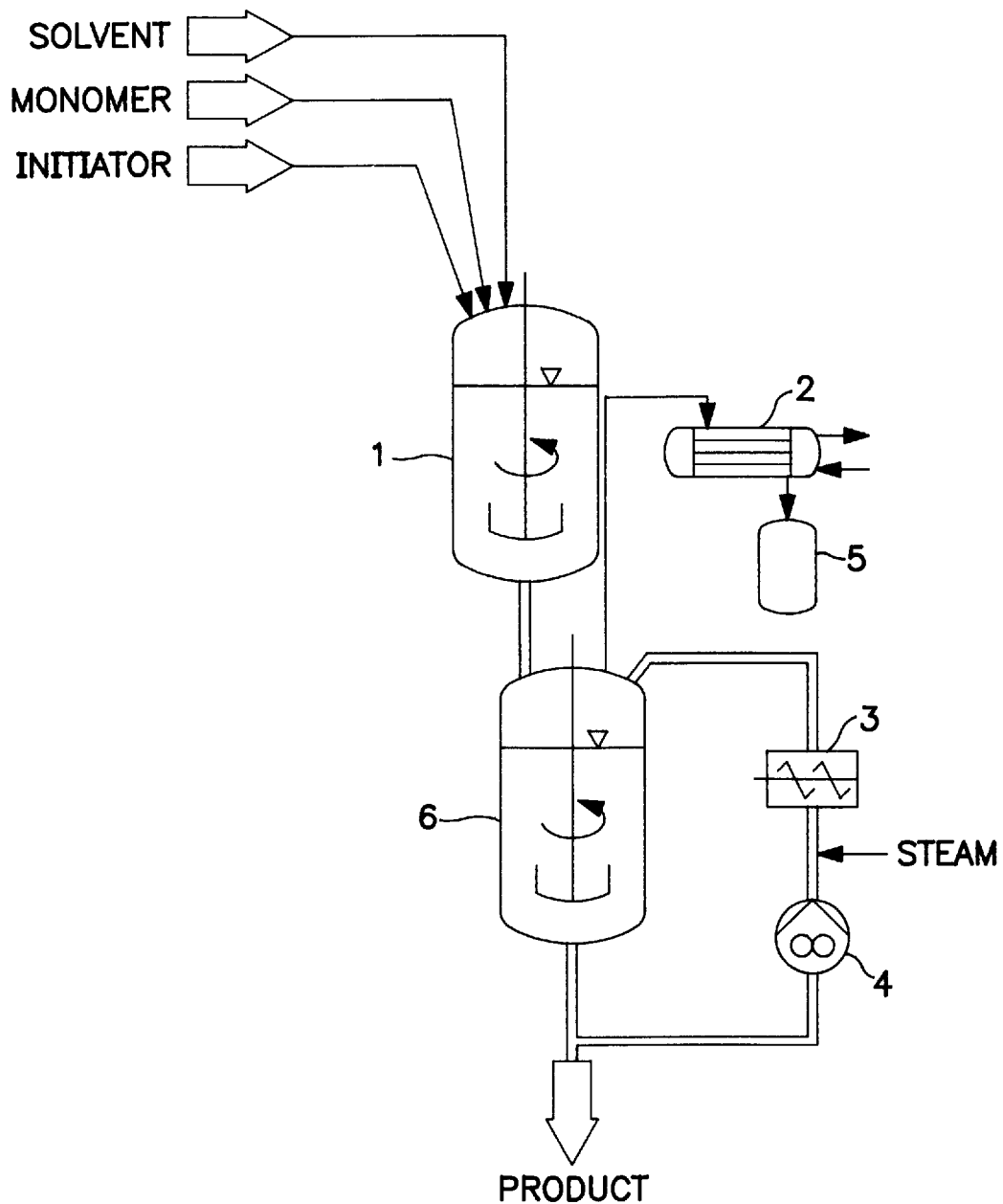
FIG. 2 is a 2-kettle plant apparatus in which polymerization is carried out in a kettle, whereas distillation and circulation are carried out in a second kettle.
Figure 3:
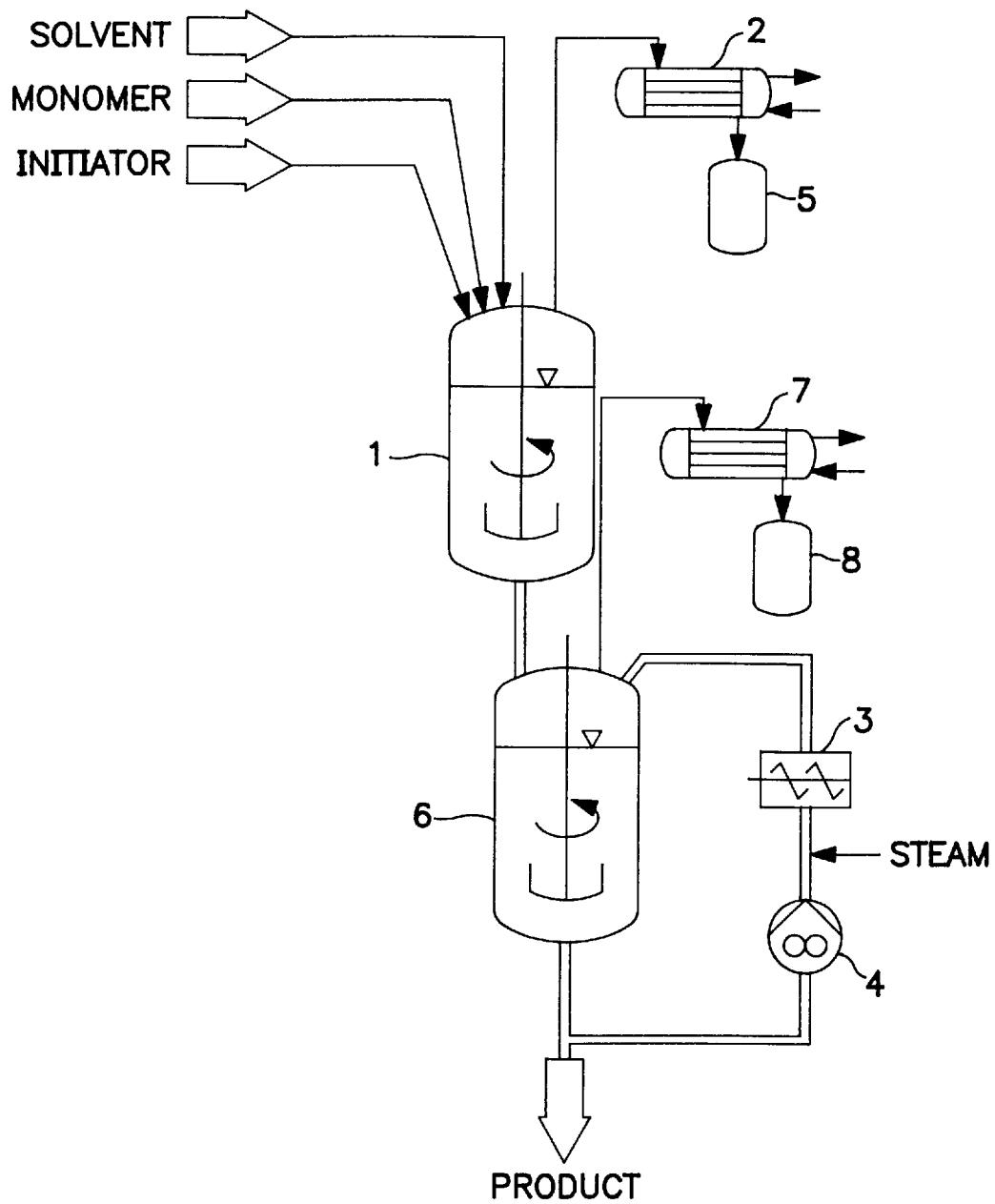
FIG. 3 is a 2-kettle plant apparatus in which a large part of the solvent is removed by distillation in the first kettle (polymerization kettle). The reduction in volatile residues continues in a second kettle.

Reference is made to FIGS. 1–3 which depict the several embodiments of the desired process. In FIG. 1, the solvent, monomer and initiator are fed into the polymerization kettle 1 which is fitted with a commercial stirrer. The polymerization kettle is also fitted with a condenser 2 by which the volatile components are removed from the melt and condensed to form a distillate 5. The polymer melt is circulated by starting gear pump 4, and the steam which is introduced is thoroughly mixed with the melt by mixer 3.

In FIG. 2, the solvent, monomer, and initiator are fed into polymerization kettle 1. The melt is fed into second kettle 6 which is fit with a condenser 2, by which volatile components are removed from the melt and condensed to form a distillate 5. The melt in second kettle 6 is circulated by starting gear pump 4, and the steam which is introduced is thoroughly mixed with the melt by mixer 3.

In FIG. 3, the solvent, monomer, and initiator are fed into the polymerization kettle 1 which is fitted with a stirrer. The polymerization kettle is fitted with a condenser 2 by which volatile components are removed from circulation and condensed to form a distillate 5. The melt is fed into second kettle 6 which is fitted with a condenser 7 by which volatile components are further removed to form a distillate 8. The melt in second kettle 6 is circulated by starting gear pump 4, and the steam which is introduced is thoroughly mixed with the melt by mixer 3.

EXAMPLES

The experiments which follow were carried out in a polymerization kettle having a capacity of 400 l. In the examples which follow, parts and percentages are by weight. The K values are determined according to DIN 53726 in 1% strength solution in tetrahydrofuran at 25° C. The solids contents (SC) were determined using a Mettler EP 16/Mettler PE 360 solids content determination apparatus.

The residues were identified by gas chromatography (Hewlett Packard model 5890) and quantified by the internal standard method.

Example 1 (prior art)

An initially taken mixture consisting of 24 kg of isobutanol, 5% of a solution of 228 kg of butyl acrylate (BA), 12 kg of acrylic acid (AA) and 0.8 kg of a copolymerizable photoinitiator and 5% of a solution of 0.480 kg of tert-butyl per-2-ethylhexanoate and 3 kg of isobutanol is polymerized for 10 minutes at 100° C. The remainder of the monomer solution is added to the reaction mixture in the course of 7 hours, and the remainder of the peroxide solution in the course of 8 hours. After the end of the peroxide feed, the internal temperature is increased to 115° C. and polymerization is completed in the course of 3 hours. The solvent and volatile components are then removed under reduced pressure at from 127° to 132° C. After an internal reactor temperature of 130° C. has been reached, the volatile residues are distilled off under a reduced pressure of <500 mbar in the course of 3 hours. A copolymer having a K value of 47.3 is obtained.

Volatile residues: isobutanol: 2300 ppm, BA 1230 ppm, AA<0.02%. SC: 99.6%.

Example 2 (according to the invention)

The procedure is as stated under Example 1, but the distillation is varied as follows: After an internal temperature of 130° C. has been reached, under a reduced pressure of about 500 mbar, the polyacrylate melt is circulated (pumping rate 400 l/hour). At the same time, 16 bar steam is fed into the circulation over 2.5 hours. Distillation is then carried out as in Example 1 for a further 0.5 hour at an internal temperature of 130° C. A copolymer having a K value of 47.7 is obtained.

Volatile residues: isobutanol: 50 ppm, n-BA<10 ppm, acrylic acid no longer detectable. SC: (after introduction of steam): 99.9%.

Example 3 (according to the invention)

The procedure is as stated under Examples 1 and 2. After an internal temperature of 130° C. and reduced pressure of 500 mbar have been reached, a sample is taken:

Volatile residues: isobutanol: 3875 ppm, n-BA: 2542 ppm, SC: 99.0%.

The circulation is then started up, 4 bar steam is passed in over 1 hour and the volatile residues are distilled off.

Volatile residues: isobutanol 518 ppm, n-BA 1212 ppm, SC: 99.8%.

The circulation and the introduction of steam are again put into operation over 1 hour and a further sample is taken.

Volatile residues: isobutanol:<10 ppm, n-BA 365 ppm, SC: 99.9%.

Example 4 (comparative example to Example 3)

The copolymer is prepared as described in Example 3, except that the circulation and steam introduction are not started up. Instead, the conventional distillation in the kettle is extended by a corresponding period, ie. by 2 hours.

Volatile residues: isobutanol: 2700 ppm, n-BA 1400 ppm, SC: 99.5%.

Example 5

An initially taken mixture consisting of 15 kg of toluene, 0.1 kg of tert-butyl per-2-ethylhexanoate and 5.0 kg of a monomer mixture comprising 95 kg of butyl acrylate and 5 kg of 2-ethylhexyl acrylate (HEA) is polymerized for 10 minutes at 100° C. under a nitrogen atmosphere. The remainder of the monomer mixture is added to the initially taken reaction mixture at an internal temperature of 100° C. in the course of 4 hours, and a solution of 1.9 kg of tert-butyl per-2-ethylhexanoate in 10 kg of toluene simultaneously in the course of 3.5 hours. After the end of the monomer addition, the internal temperature is increased and stirring is continued for 4 hours at 115° C. The resin solution obtained is divided into two portions.

Example 5.1 (according to the invention)

The solvent and volatile components are then distilled off, the circulation with introduction of 4 bar steam being started up after an internal temperature of 130° C. and a reduced pressure of 500 mbar have been reached. After steam stripping for 2 hours, a sample is taken.

Volatile residues: toluene:<10 ppm, n-BA:<10 ppm, 2-HEA: <10 ppm, SC: 99.9%. Example 5.2 (comparative example)

The solvent and volatile components are distilled off.

After 130° C. and 500 mbar have been reached, the distillation is continued for 2 hours in the kettle. An internal temperature of 130° C. is maintained.

Volatile residues: toluene: 750 ppm, n-BA: 1300 ppm, 2-HEA: 970 ppm.

In both cases, a copolymer having a K value of 42.3 is obtained.

We claim:

1. A process for the elimination of volatile components from polyacrylate melts prepared by polymerization, which comprises distilling the volatile components under reduced pressure;

adding an entraining agent directly into a bypass containing the melt, said entraining agent selected from the group consisting of steam, nitrogen, argon or $CO_2$ at above 100° C., said entraining agent being added while circulating the melt.

2. A process as claimed in claim 1, wherein steam at from 1 to 20 bar is added.

3. A process as claimed in claims 1, wherein the polymerization and distillation are carried out in a 1-kettle plant or a 2-kettle plant.

4. A process as claimed in claim 2, wherein the entraining agent used is steam.

5. A process as claimed in claim 1, wherein the polyacrylate melt is circulated at least once.

6. A process as claimed in claim 1, wherein the polyacrylate melts has a glass transition temperature of from −50° to 0° C.

7. A process as claimed in claim 1, wherein the polyacrylate melt has a glass transition temperature of from −45° to −5° C.

8. A process as claimed in claim 1, wherein the polyacrylate melt has a bulk modulus value of from 10 to 120.

9. A process as claimed in claim 1, wherein the polyacrylate melt has a bulk modulus value of from 15 to 80.

10. A process as claimed in claim 1, wherein the polyacrylate melt has a bulk mudulus value of for 20 to 60.

11. A process as claimed in claim 1, wherein the polyacrylate melt is a raw material base for UV-crosslinkable hotmelt adhesives.

12. A process as claimed in claim 1, wherein the polyacrylate melt is a flexible resin for plasticizing coating and adhesive raw materials.

* * * * *

UNITED STATES PATENT AND TRADEMARK OFFICE
CERTIFICATE OF CORRECTION

PATENT NO.: 5,772,851

DATED: June 30, 1998

INVENTOR(S): BARWICH et al.

It is certified that error appears in the above-identified patent and that said Letters Patent is hereby corrected as shown below:

On the cover page, insert the following priority information:

-- [30]  Foreign Application Priority Data
  Nov. 25, 1993  [DE]  Germany ............ P 43 40 136.8--.

Col. 8, claim 1, line 13, after ";" insert --and--.

Col. 8, claim 1, line 16, "or" should be --and--.

Col. 8, claim 3, line 21, "claims" should be --claim--.

Col. 8, claim 4, line 24, "2" should be --1--.

Col. 8, claim 10, line 2, "mudulus" should be --modulus--.

Signed and Sealed this

Thirteenth Day of October 1998

Attest:

BRUCE LEHMAN

*Attesting Officer*     *Commissioner of Patents and Trademarks*